(12) United States Patent
Hunt et al.

(10) Patent No.: US 7,807,076 B2
(45) Date of Patent: Oct. 5, 2010

(54) PROCESS FOR THE PREPARATION OF MICROCAPSULES

(75) Inventors: Ann Hunt, Stockport (GB); Robert Montgomery O'Neil, Manchester (GB)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 1469 days.

(21) Appl. No.: 10/493,277

(22) PCT Filed: Oct. 17, 2002

(86) PCT No.: PCT/EP02/11645

§ 371 (c)(1),
(2), (4) Date: Apr. 20, 2004

(87) PCT Pub. No.: WO03/035245

PCT Pub. Date: May 1, 2003

(65) Prior Publication Data

US 2004/0245661 A1 Dec. 9, 2004

(30) Foreign Application Priority Data

Oct. 25, 2001 (EP) .................................. 01811044

(51) Int. Cl.
*B01J 13/02* (2006.01)
*B01J 13/18* (2006.01)
*B41M 5/165* (2006.01)

(52) U.S. Cl. ........................ 264/4.3; 264/4.33; 264/4.7; 428/402.2; 503/214; 503/215

(58) Field of Classification Search ......... 264/4.3–4.33, 264/4.7; 428/402.21; 503/214, 215
See application file for complete search history.

(56) References Cited

U.S. PATENT DOCUMENTS

| 3,516,846 A | 6/1970 | Matson | 117/36.2 |
| 4,105,823 A | 8/1978 | Hasler et al. | 428/307 |
| 4,406,816 A | 9/1983 | Sliwka | 521/69 |
| 4,898,696 A | 2/1990 | Sliwka | 182/223 |

FOREIGN PATENT DOCUMENTS

| GB | 2 073 132 A | * 10/1981 |
| GB | 2073132 | 10/1981 |

* cited by examiner

*Primary Examiner*—James Seidleck
*Assistant Examiner*—Saira Haider
(74) *Attorney, Agent, or Firm*—Shiela A. Loggins

(57) ABSTRACT

An improved process for the preparation of microcapsules consisting essentially of a wall material and a core material in condensing a melamine-formaldehyde precondensate and/or methyl ethers thereof in an aqueous dispersion of a water-insoluble core material and in the presence of an acrylic acid/acrylamide copolymer at acidic pH and at a temperature in the range of from 20° to 100° C., and hardening thereafter the melamine-formaldehyde precondensate to form the walls of the microcapsules at an elevated temperature, wherein the core material is dispersed in the precondensate/copolymer solution without initial partial condensation of the precondensate and copolymer and wherein the hydrophobe point of the precondensate and/or its methyl esters is less than 90° C., as well as microcapsules, paper and pressure-sensitive recording material comprising such microcapsules.

7 Claims, No Drawings

PROCESS FOR THE PREPARATION OF MICROCAPSULES

This application is a 371 of international application PCT/EP02/11645 filed Oct. 17, 2002, which claims priority based on European patent application No. 01811044.5, filed Oct. 25, 2001, the disclosures of which are incorporated by reference herein.

This invention relates to a process for the encapsulation of substantially water-insoluble core material by the condensation of melamine-formaldehyde precondensates and/or the methyl ethers thereof in water, in which the core material is dispersed. The process is particularly suited, but is not limited to the preparation of microcapsules for use in carbonless copy paper.

Pressure-sensitive copying paper, also known as carbonless copying paper is well known and widely used in the production of business forms. A business forms set comprises an upper sheet (usually referred to as a CB sheet) coated on its lower surface with microcapsules containing a solution in an oil solvent of one or more colour formers (chromogenic material) and a lower sheet (usually referred to as a CF sheet) coated on its upper surface with a colour developer composition. To generate more than one copy, intermediate sheets (usually referred to as CFB sheets) are used, each of which is coated on its lower surface with microcapsules and on its upper surface with colour developer composition. Pressure exerted on the sheets by writing or printing ruptures the microcapsules, transferring the colour former-containing solution on to the colour developer. A chemical reaction occurs which develops the colour of the chromogenic material thereby forming the copy image.

A further type of pressure-sensitive copying paper, usually known as self-contained paper comprises microcapsules and colour developer coated on to the same surface of a sheet. Writing or printing on a sheet placed above the self-contained sheet ruptures the microcapsules, releasing the solution of colour formers, which then react with the colour developer on the sheet to produce an image.

U.S. Pat. No. 4,100,103 discloses a process for the preparation of microcapsules by the condensation of melamine formaldehyde or methylated methylol melamine in the presence of various maleic anhydride copolymers or poly (acrylic acid).

U.S. Pat. No. 4,233,178 discloses a process for the preparation of microcapsules by the condensation of melamine formaldehyde precondensate in the presence of a styrene-maleic anhydride copolymer.

U.S. Pat. No. 4,409,156 discloses a process for the preparation of microcapsules by the condensation of melamine formaldehyde prepolymer in the presence of a styrene-sulfonic acid polymer or a copolymer containing styrene sulfonic acid.

U.S. Pat. No. 4,406,816 discloses a process for the preparation of microcapsules by condensation of melamine formaldehyde precondensates and/or their $C_1$-$C_4$ alkyl ethers in the presence of a homopolymer or copolymer which possesses sulfonic acid groups.

In GB-A 2,073,132 a process is described for the production of microcapsules by the polymerisation of a melamine formaldehyde precondensate in the presence of a polymer in an aqueous medium in which the core material is dispersed. The process comprises essentially of the steps establishing an aqueous medium at acidic pH which contains both a melamine formaldehyde precondensate and a polymer establishing a substantially stable dispersion of core material in the aqueous medium and condensing the precondensate to produce a condensate which separates from solution and enwraps the core material to produce microcapsules.

GB-A 2,073,132 teaches that with certain, but not all commercially available precondensates it is necessary to condense the precondensate partially in the presence of polymer as a preliminary stage of the process to produce a dispersion-stabilising species. It notes that precondensates which afford a dispersion stabilising species without the need for preliminary partial condensation have a hydrophobe point above 90° C. Core material may be added to and dispersed immediately in a mixture of such high hydrophobe point precondensates under acidic conditions without the need for a preliminary partial condensation step. In contrast, precondensates with a lower hydrophobe point, for example, in the region of 40-50° C. require partial condensation in the presence of polymer prior to addition of the core material.

In GB-A 2,073,132, the range of preferred polymers suitable for this purpose is relatively large, for example, polyvinyl alcohol, gelatine, ethylene/maleic anhydride copolymers, acrylic acid/acrylamide copolymers, starch and starch derivatives, cellulose derivatives such as carboxymethyl cellulose or hydroxyethyl cellulose, alginates, polyurethanes and polyethylene oxide.

U.S. Pat. No. 4,105,823 describes a method of encapsulating a finely divided material to produce microcapsules, and which process comprises inter alia the steps of providing a dispersion of said material in an aqueous medium containing a water soluble urea-formaldehyde precondensate, a water soluble melamine-formaldehyde precondensate, and a water-soluble polymer. However, this system needs a second precondensate, urea-formaldehyde.

U.S. Pat. No. 4,898,696 discloses and claims a process for preparing microcapsules having melamine-formaldehyde condensate capsule walls, a hydrophobic material to be encapsulated such as liquids or a color former and 1-5.5% by weight based on the aqueous phase a water soluble high polymer containing strongly acid groups such as sulfocontaining homopolymer or copolymer of corresponding (meth) acrylates. As the given comparative examples, which are used polyacrylic acid as a water soluble high polymer, show inferior properties, the teaching of this patent then is that sulfo-containing polymers are an essential feature for success of the claimed process. The same considerations apply for U.S. Pat. No. 4,406,816.

Therefore, it was the object of this invention to provide a process in which microcapsules can be prepared by condensing a melamine formaldehyde precondensate and/or their methyl ethers thereof having a hydrophobe point of less than 90° C. in an aqueous dispersion of a substantially water insoluble core material, in the presence of an acrylic acid/acrylamide copolymer under acidic conditions, without the need for an initial step involving the partial condensation of the precondensate and copolymer.

Accordingly, an improved process for the preparation of microcapsules was found consisting essentially of a wall material and a core material in condensing a melamine-formaldehyde precondensate and/or methyl ethers thereof in an aqueous dispersion of a water-insoluble core material and in the presence of an acrylic acid/acrylamide copolymer at acidic pH and at a temperature in the range of from 20° to 100° C., and hardening thereafter the melamine-formaldehyde precondensate to form the walls of the microcapsules at a temperature in the range of from 50 to 100° C., wherein the core material is dispersed in the precondensate/copolymer solution without initial partial condensation of the precondensate and copolymer and wherein the hydrophobe point of the precondensate and/or its methyl esters is less than 90° C.

In the present invention, the melamine formaldehyde precondensate and/or its methyl ethers thereof may be conveniently mixed with the acrylic acid/acrylamide copolymer, the pH adjusted to 3.0-5.5 and the core material usually is added and dispersed with a high speed stirrer or homogenizer. Alternatively, the melamine-formaldehyde precondensate and/or its methyl ethers and the acrylic acid/acrylamide copolymer may be added either individually or pre-combined to the core material.

Dispersing of the core material generally is continued until the microcapsules have formed.

Normally, microcapsules are formed within 30 to 90 minutes, preferably within one hour.

In a preferred embodiment of this invention, the aqueous dispersion is mixed under vigorous stirring until the microcapsules are formed and is subsequently stirred in conventional ways whilst hardening of the capsule wall is being completed.

Suitable conventional stirrers may be, for example, of the anchor, propeller or impeller-type. As a rule, hardening of the wall material is effected by raising the temperature of the dispersion to a range from 50 to 100° C., preferably from 70 to 90° C. and most preferably from 70 to 80° C.

In another preferred embodiment of this invention, after hardening, the excess of formaldehyde in the microcapsule dispersion is removed by addition of a substance which reacts substantially quantitatively with formaldehyde. Such substances can be e.g. urea, imidazolidin-2-one, tetrahydro-2-pyrimidone, melamine, diethanolamine, ammonia, acetylacetone or sodium sulfite.

The present invention usually produces microcapsules that are substantially spherical and with diameters from less than 1 micron to about 100 microns. For carbonless paper applications usually a range of from 1 to 10, preferably 3 to 8, more preferably 4 to 6 microns are chosen. Generally, the size of the capsules can be controlled to a certain extent by the rotation speed of the dispersing device, the concentration of the acrylic acid/acrylamide copolymer used and the viscosity of the aqueous phase.

The monitoring of capsule formation and capsule size can be achieved through observation under the microscope. Droplets of unencapsulated oil quickly coalesce on a microscope slide whereas encapsulated oil droplets remain stable.

Suitable melamine-formaldehyde precondensates and/or methyl ethers thereof preferably have a melamine to formaldehyde ratio of from 1:1.5 to 1:6, preferably from 1:3 to 1:6. These precondensates usually are N-methylolmelamine compounds and methyl ethers thereof and are miscible in water in all proportions. The precondensates have a hydrophobe point (the temperature at which a 5% aqueous solution of the precondensate starts to separate from solution on heating gradually from cold) of less than 90° C., preferably from 40° C. to 70° C.

Suitable acrylic acid/acrylamide copolymers usually are produced from monomer mixture of acrylic acid and acrylamide wherein the acrylic acid content is chosen in the range of from 30 to 70%, preferably 40 to 60% by weight.

The weight ratio of copolymer to precondensate used in the present process is generally in the range 0.05:1 to 20:1, preferably in the range 0.1:1 to 10:1.

To adjust the pH usual acidic compounds such as formic acid, acetic acid, citric acid, sulphuric acid and phosphoric acid may be used. The point of addition of the acid is as a rule not critical and may, for example, be added after the precondensate and polymer have been mixed together and either before or after the subsequent addition of the core material. Alternatively the acid may be added following addition of the water-soluble components to the core material. The pH for the condensation reaction is generally in the range of from 3 to 5.5, preferably in the range of from 3.5 to 4.5.

The core material usually comprises water-immiscible liquids or substantially water insoluble liquids. Such liquids include, for example, alkylated naphthalenes, alkylated biphenyls, phenyl aryl methanes, diaryl methanes, dibenzyl benzene derivatives, alkylated benzenes, partially hydrogenated terphenyls, diethyl phthalate, dibutyl phthalate, natural oils such as rapeseed oil, sunflower oil, groundnut oil, soya bean oil, coconut oil, diesters of adipic, sebacic and azelaic acids, trimethylol propane esters and fatty acid esters such as methyl oleate and mixtures thereof. In addition, a diluent may be included in the core material. Examples of diluents include aliphatic hydrocarbons, kerosenes and naphthenic oils and mixtures thereof.

In a preferred embodiment of this invention the core material comprises a water-immiscible or substantially water-insoluble liquid containing therein a dissolved chromogenic material. Preferably such a chromogenic material is a colour former if the microcapsules are to be used in pressure-sensitive copying systems. Examples of colour formers include fluoran derivatives, phthalide derivatives, carbazole derivatives, benzoxazine derivatives, spiropyran derivatives and quinazoline derivatives, each of which is extensively covered in the patent literature. The colour formers may be used individually, or more commonly, mixtures of colour formers are employed. Typically, colour formers are combined together to produce either a blue or black image but other shades are also possible.

In a preferred embodiment, the colour former or colour former mixture is dissolved in the core material before it is added to the reaction mixture.

The amount of colour former in the core material is normally in the range of from 1 to 10% by weight, preferably in the range of from 3 to 8% by weight based on the total amount of core material.

Another preferred embodiment of this invention concerns microcapsules prepared according to the inventive process, paper coated with the inventive microcapsules, and pressure-sensitive recording material comprising the inventive microcapsules.

The microcapsules of this invention are produced by a simplified and quicker process with narrower size distribution and improved wall impermeability in comparison to those prepared according to the process described in GB-A 2,073,132. In addition, the present invention may be operated as a batch process or a continuous process.

EXAMPLES

Example 1

Into a 1 liter vessel are added with gentle stirring (500-1,000 rpm) a solution comprising 25.0 g acrylic/acrylamide copolymer (Ciba®ALCAPSOL® 144, a 20% by weight aqueous solution, acrylic acid content of monomer mix: 43% by weight) dissolved in water (75.0 g) and a solution comprising 21.5 g of a methylated melamine-formaldehyde precondensate ('Beetle' Resin PT336, a 70% by weight aqueous solution, formaldehyde unit:melamine unit ratio=5.8:1, hydrophobe point 40 to 50° C.) dissolved in water (70.0 g). Then the stirrer speed is raised to 6,000 rpm to produce thorough mixing and a solution comprising 5.0 g of a mixture of colour formers (Ciba®PERGASCRIPT®Black I-R, Ciba®PERGASCRIPT®Green I-2GN, Ciba®PERGASCRIPT®Blue I-2RN, Ciba®PERGASCRIPT® Blue S-RB P, and Ciba®PERGASCRIPT®Orange I-G) dissolved in 95 g of a mixture comprising 70 parts by weight diisopropylnaphthalene (KMC oil supplied by Rutgers Kureha Solvents GmbH) and 30 parts by weight of dearomatised hydrocarbons (Exxsol™ D 100 supplied by Exxon Mobil Chemical, boiling point range 235 to 270° C.) is added. Then approximately 6 ml of formic acid (10% by weight aqueous solution) are added to achieve a pH of 4.3. Thorough stirring is continued whilst the temperature of the mixture is maintained at about 30° C. After about one hour, a stable dispersion of capsules has formed. The dispersion is then gently stirred (500 to 1,000 rpm) for one hour at about 30° C.

To harden the capsules, the temperature of the dispersion is raised to 75° C. and held at this temperature for 1½ hours. After hardening, the temperature is reduced to about 25° C. The microcapsule dispersion is then neutralised by the addition of diethanolamine (50% aqueous solution, approx. 3 ml) followed by an aqueous solution of concentrated ammonia (approx. 4 ml).

Example 2

Into a 1 liter vessel are added with gentle stirring (500 to 1,000 rpm) a solution comprising a mixture of colour formers (5.0 g, as in ex. 1) dissolved in 95 g of a mixture comprising 70 parts by weight diisopropylnaphthalene and 30 parts by weight of dearomatised hydrocarbons. Then the stirrer speed is raised to 6,000 rpm to produce thorough mixing and thereafter solutions comprising acrylic/acrylamide copolymer (Ciba®ALCAPSOL® 144, as in ex. 1) (25.0 g) dissolved in water (75.0 g) and a melamine-formaldehyde precondensate ('Beetle' Resin PT336, as in ex. 1) (21.5 g) dissolved in water (70.0 g) are added in succession. Approximately 6 ml of formic acid (10% by weight aqueous solution) is then added to achieve a pH of 4.3. Thorough stirring is continued whilst the temperature of the mixture is maintained at about 30° C. After about one hour, a stable dispersion of capsules has formed. The dispersion is then gently stirred (500 to 1,000 rpm) for one hour at about 30° C.

To harden the capsules, the temperature of the dispersion is raised to 75° C. and held at this temperature for 1½ hours. After hardening, the temperature is reduced to about 25° C. The microcapsule dispersion is then neutralised by the addition of diethanolamine (50% aqueous solution, approx. 3 ml) followed by an aqueous solution of concentrated ammonia (approx. 4 ml).

Comparative Example 1

Into a 1 liter vessel are added with gentle stirring (500 to 1,000 rpm) a solution comprising acrylic acid/acrylamide copolymer (Ciba®ALCAPSOL® 144, as in ex. 1) (25.0 g) dissolved in water (75.0 g) and a solution comprising a melamine-formaldehyde precondensate ('Beetle' Resin PT336, as in ex. 1) (21.5 g) dissolved in water (70.0 g). Formic acid (10% by weight aqueous solution, approximately 6 ml) is added to achieve a pH of 4.3 and the mixture is stirred for 1¾ hours at approximately 30° C. The stirrer speed is then raised to 6,000 rpm to produce thorough mixing and a solution comprising colour formers (5.0 g) dissolved in 95 g of a mixture comprising 70 parts by weight diisopropylnaphthalene and 30 parts by weight of dearomatised hydrocarbons (as in ex. 1) is added. Stirring is continued until a dispersion of microcapsules has formed (approx. 1 hour). After this time, the capsule dispersion is stirred gently for 1 hour. The temperature of the dispersion is raised to 75° C. and held at this temperature for 1½ hours. After hardening, the temperature is reduced to about 25° C. The microcapsule dispersion is then neutralised by the addition of diethanolamine (50% aqueous solution, approx. 3 ml) followed by an aqueous solution of concentrated ammonia (approx. 4 ml).

Example 3

Samples of the microcapsule dispersions prepared above are analysed qualitatively under a microscope and additionally, the size distributions are measured with a Coulter LS 230 Particle Size Analyser (Table 1).

Under the microscope, the microcapsules prepared according to the invention (examples 1 and 2) and comparative example 1 are individual capsules, substantially spherical in shape with no aggregates present.

TABLE 1

| Microcapsules | mean (µm) | median (µm) | mode (µm) |
| --- | --- | --- | --- |
| Ex. 1 | 5.7 | 3.9 | 3.7 |
| Ex. 2 | 4.9 | 4.5 | 4.9 |
| Comp.Ex. 1 | 9.9 | 10.1 | 12.4 |

The variables quoted are the mean capsule diameter, the median (capsule diameter at which half of the distribution is larger and half is smaller) and the mode (capsule diameter for the most frequent particle size). The microcapsules prepared according to the invention (examples 1 and 2) have a lower median and a narrower size distribution compared with the microcapsules of comparative example 1. The median size of the microcapsules of examples 1 and 2 and their narrow size distribution are particularly suitable for the production of pressure sensitive recording materials.

Example 4

The microcapsule dispersion is diluted 1:1 with water and a thin layer is applied with a laboratory coating bar on to a commercial CF sheet. The paper is dried at ambient temperature for one hour. It is then examined for signs of coloration indicative of the presence of free capsule oil. The results (Table 2) are assessed as follows:
1. No coloured specks
2. A few coloured specks
3. Many coloured specks
4. Uniform discoloration
5. Uniform severe discoloration

TABLE 2

| Coated CF paper produced with microcapsules of | Rating |
| --- | --- |
| Example 1 | 1 |
| Example 2 | 1 |
| Comparative example 1 | 5 |

The CF papers coated with microcapsules of the invention (examples 1 and 2) show no signs of discoloration or even specks of colour, indicating a high degree of encapsulation. In contrast, the CF papers coated with microcapsules of comparative example 1 show a pronounced discoloration indicating incomplete encapsulation. In addition to being suitable for the production of CB papers, the microcapsules of the invention are also suitable for use in self-contained papers, in which the encapsulated colour formers and colour developing material are applied to the same surface of a sheet.

Example 5

A coating composition is prepared as follows:

|  | Parts by weight |
| --- | --- |
| Microcapsule dispersion | 64.0 |
| Spacer[1] | 10.2 |
| 50% latex dispersion[2] | 10.2 |
| Water | 156.0 |

(1) Arbocel® BE 600/30, a cellulose fibre spacer of average length 30 microns and average thickness 18 microns supplied by Rettenmaier & Söhne GmbH (2) Dow Latex DL 950, a carboxylated styrene-butadiene copolymer supplied by Dow Chemical Company Ltd.

The above composition is applied at a coat weight of approximately 5 g/m² to a base paper. After drying, the whiteness of the resulting CB sheet is measured with a Gretag SPM 50 spectrophotometer. The whiteness is then measured after ageing the sheet for 24 hr/110° C. (Table 3).

TABLE 3

| CB produced with microcapsules of | initial whiteness (CIE) | whiteness (CIE) after 24 hr/110° C. |
| --- | --- | --- |
| Example 1 | 90.1 | 75.1 |
| Example 2 | 90.4 | 77.7 |
| Comparative ex. 1 | 84.9 | 70.3 |

The CB sheets prepared with microcapsules of the present invention (Examples 1 and 2) have better initial whiteness and whiteness after ageing than comparative example 1.

Example 6

A CB sheet prepared as in Example 5 is placed coated side down on top of a sheet of commercial CF paper coated side up. A CB to CF print is then made using a dot matrix printer. The intensity of the image produced on the CF sheet is measured after 2 minutes, 1 hour and 24 hours (Table 4).

TABLE 4

| CB produced with microcapsules of | image intensity after 2 minutes | image intensity after 1 hour | image intensity after 24 hours |
| --- | --- | --- | --- |
| Example 1 | 0.68 | 0.73 | 0.76 |
| Example 2 | 0.70 | 0.72 | 0.77 |
| Comparative ex. 1 | 0.55 | 0.58 | 0.65 |

The CB sheets prepared with microcapsules of the present invention (Examples 1 and 2) produced more intense images on CF paper than comparative example 1.

Example 7

A CB sheet prepared as in example 5 above is cut into two strips, one of which is stored at ambient temperature, the other placed in an oven at 110° C. for 24 hr. The two strips are then placed coated side down on to strips of commercial CF paper coated side up. CB to CF prints are then made using a dot matrix printer. The intensity of the image produced on the CF sheets is measured after 2 minutes, 1 hour and 24 hours with a Gretag SPM 50 spectrophotometer. The results (Table 5) are expressed as the % image remaining after ageing, i.e.

Image remaining=$I_a/I_i \times 100\%$

Where $I_a$ is the intensity of the image after ageing and $I_i$ is the image intensity without ageing.

TABLE 5

| CB produced with microcapsules of | image remaining (printed after 2 minutes) | image remaining (printed after 1 hour) | image remaining (printed after 24 hours) |
| --- | --- | --- | --- |
| Example 1 | 94% | 94% | 92% |
| Example 2 | 93% | 97% | 94% |
| Comparative ex. 1 | 29% | 29% | 28% |

After ageing, the CB sheets prepared with microcapsules of the present invention (examples 1 and 2) show less image intensity loss when printed on to CF paper than comparative example 1 thus indicating superior wall impermeability.

The invention claimed is:

1. A process for the preparation of microcapsules consisting essentially of a wall material and a core material consisting essentially of the steps of condensing a melamine-formaldehyde precondensate and/or methyl ethers thereof in an aqueous dispersion of a water-insoluble core material and in the presence of an acrylic acid/acrylamide copolymer at acidic pH and at a temperature in the range of from 20° to 100° C., and hardening thereafter the melamine-formaldehyde precondensate to form the walls of the microcapsules at a temperature in the range of from 50 to 100° C.,
wherein the core material is dispersed in the precondensate/copolymer solution without initial partial condensation of the precondensate and copolymer and wherein the hydrophobe point of the precondensate and/or its methyl esters is less than 90° C.

2. A process as in claim 1, wherein the aqueous dispersion is mixed under vigorous stirring until the microcapsules are formed and is subsequently stirred while hardening the capsule wall.

3. A process as in claim 1, wherein after hardening, the excess of formaldehyde in the microcapsule dispersion is removed by addition of a substance which reacts substantially quantitatively with formaldehyde.

4. A process according to claim 1, wherein the core material comprises a water-immiscible or substantially water-insoluble liquid containing therein a dissolved chromogenic material.

5. Microcapsules prepared according to claim 1.

6. Paper coated with microcapsules prepared according to claim 1.

7. Pressure-sensitive recording material comprising the microcapsules produced according to claim 1.

* * * * *